United States Patent
Dumm et al.

(10) Patent No.: US 12,246,409 B2
(45) Date of Patent: Mar. 11, 2025

(54) METHOD FOR COMPENSATING POSITIONING ERRORS IN AN EDGING PROCESS, OR IN A FASTENING OPERATION FOR A RAW-EDGED, FINISHED SPECTACLE LENS, AND DEVICE THEREFOR

(71) Applicant: Rodenstock GmbH, Munich (DE)

(72) Inventors: Martin Dumm, Kirchberg (DE); Markus Grau, Ismaning (DE); Andreas Keil, Mühldorf (DE); Philipp Merkelbach, Bernried (DE); Ahmet Ögüt, Regen (DE); Karl Rahn, Regen (DE); Jasmine Reick, Munich (DE); Peter Szegö, Feldkirchen (DE); Arne Urban, Feldkirchen (DE); Holger Wild, Schaufling (DE)

(73) Assignee: Rodenstock GmbH, Munich (DE)

(*) Notice: Subject to any disclaimer, the term of this patent is extended or adjusted under 35 U.S.C. 154(b) by 1200 days.

(21) Appl. No.: 17/042,721

(22) PCT Filed: Mar. 29, 2019

(86) PCT No.: PCT/EP2019/058019
§ 371 (c)(1),
(2) Date: Sep. 28, 2020

(87) PCT Pub. No.: WO2019/185871
PCT Pub. Date: Oct. 3, 2019

(65) Prior Publication Data
US 2021/0362294 A1 Nov. 25, 2021

(30) Foreign Application Priority Data
Mar. 29, 2018 (DE) .......................... 102018204948.3

(51) Int. Cl.
*B24B 47/22* (2006.01)
*B24B 9/14* (2006.01)
*G02C 7/02* (2006.01)

(52) U.S. Cl.
CPC ............ *B24B 47/225* (2013.01); *B24B 9/148* (2013.01); *G02C 7/02* (2013.01)

(58) Field of Classification Search
CPC .. B24B 5/02; B24B 5/16; B24B 5/162; B24B 9/14; B24B 9/142; B24B 13/0006–0025;
(Continued)

(56) References Cited

U.S. PATENT DOCUMENTS

| 5,454,194 A | 10/1995 | Gottschald |
| 5,638,169 A * | 6/1997 | Hollmann ........... B24B 13/0055 356/127 |

(Continued)

FOREIGN PATENT DOCUMENTS

| EP | 2199021 | 6/2010 |
| JP | 2004122238 | 4/2004 |

(Continued)

OTHER PUBLICATIONS

Machine translation of KR-20180011372-A (Year: 2018).*

*Primary Examiner* — Robert F Neibaur
(74) *Attorney, Agent, or Firm* — Jordan IP Law, LLC

(57) ABSTRACT

The invention relates to a method for compensating positioning error in an edging process or in a fastening operation for a raw-edged, finished spectacle lens, the method comprising: —determining centring deviation parameters, said centring deviation parameters indicating the occurrence of positioning errors for the raw-edged, finished spectacle lens during a fastening operation and/or during a subsequent edging process, and —modifying control information with the aid of the determined centring deviation parameters such (Continued)

Figure 2A:
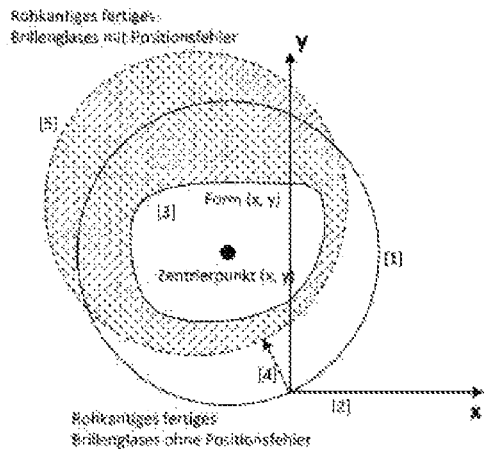

that the positioning errors for the raw-edged, finished spectacle lens are compensated and/or taken into account. The invention also related to a corresponding device.

12 Claims, 7 Drawing Sheets

(58) Field of Classification Search
CPC ..... B24B 13/005; B24B 13/06; B24B 13/065; B24B 13/0052; B24B 13/0055; B24B 41/06; B24B 41/061; B24B 47/22; B24B 47/225; B24B 49/04
USPC .......................... 451/1, 5, 42, 43, 255, 384
See application file for complete search history.

(56) References Cited

U.S. PATENT DOCUMENTS

| | | | | |
|---|---|---|---|---|
| 6,608,673 | B2* | 8/2003 | Akiyama | B24B 9/146 356/127 |
| 6,719,609 | B2* | 4/2004 | Mizuno | B24B 49/16 451/10 |
| 6,848,969 | B2* | 2/2005 | Luderich | B24B 49/04 451/10 |
| 7,033,024 | B2* | 4/2006 | Fendt | G02C 7/061 351/159.75 |
| 9,227,299 | B2* | 1/2016 | Eurin | B24B 13/0055 |
| 9,254,615 | B2* | 2/2016 | Gourraud | B24B 13/005 |
| 10,507,532 | B2* | 12/2019 | Wielandts | B23B 31/28 |
| 10,639,765 | B2* | 5/2020 | Piraube | B24B 13/00 |
| 2002/0155787 | A1 | 10/2002 | Luderich | |
| 2014/0085627 | A1* | 3/2014 | Chauveau | B24B 51/00 356/124 |

FOREIGN PATENT DOCUMENTS

| | | | |
|---|---|---|---|
| JP | 2008114781 | 9/2008 | |
| JP | 2011161619 | 8/2011 | |
| JP | 2014176948 | 9/2014 | |
| JP | 2015125300 | 7/2015 | |
| KR | 20180011372 A | * 2/2018 | ....... B29D 11/00461 |
| WO | 0170459 | 9/2001 | |

* cited by examiner

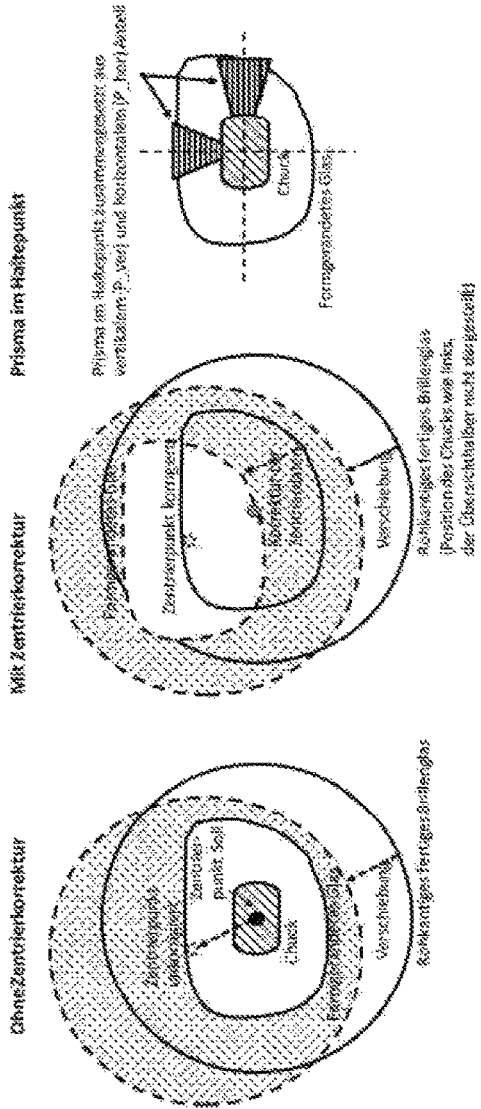

Fig. 1a

[TN: Ohne Zentrierkorrektur = without centering correction

Zentrierpunkt unkorrigiert = Centering point uncorrected

Zentrierpunkt Soll = Target centering point

Formgerandetes Glas = Edged lens

Verschiebung = Slippage]

Rohkantiges fertiges Brillenglas = Raw-edged finished spectacle lens

Fig. 1b

[TN: Mit Zentrierkorrektur = with centering correction

Zentrierpunkt korrigiert = Centering point corrected

Korrektur der Zentrierdaten = Correction of centering data (Position des Chucks wie links, der Übersichthalber nicht dargestellt) = (Position of the chuck same as left, not depicted for the sake of simplicity)]

Fig. 1c

[TN: Prisma im Haltepunkt = Prism in fastening point

Prisma im Haltepunkt zusammengesetzt aus vertikalem (P_ver) und horizontalem (P_hor) Anteil =
Prism in fastening point composed of vertical (P_ver) and horizontal (P_hor) Components]

[TN: Rohkantiges fertiges Brillenglas mit Positionsfehler =
Raw-edged finished spectacle lens with positioning error Form (x, y) = shape (x, y)

Zentrierpunkt (x, y) = centering point (x, y)

Rohkantiges fertiges Brillenglas ohne Positionsfehler =
Raw-edged finished spectacle lens without positioning error

[TN: Verschiebung = slippage]

[TN: x-Abweichungen (mm) = x-deviations (mm)

Toleranzgrenzen = tolerance thresholds

Zentrierabweichung der formgerandeten Gläser = Centering deviation of the edged lenses]

[TN: Toleranzgrenzen = tolerance thresholds

Zentrierabweichung der formgerandeten Gläser = Centering deviation of the edged lenses Versuch 1; Versuch 2 = Test 1; Test 2]

[TN: y-Abweichungen (mm) = y-deviations (mm)

Toleranzgrenzen = tolerance thresholds

Zentrierabweichung der formgerandeten Gläser = Centering deviation of the edged lenses]

[TN: y-Abweichungen (mm) = y-deviations (mm)

Toleranzgrenzen = tolerance thresholds

Versuch 1; Versuch 2 = Test 1; Test 2

Zentrierabweichung der formgerandeten Gläser = Centering deviation of the edged lenses]

[TN: Accept / reject rate for tests of the method for compensation
of positioning errors in an edging process or in
a fastening process of a raw-edged finished spectacle lens Test A – without accounting for the positioning errors Test B – with accounting for the positioning errors]

■ Accept    □ Reject

METHOD FOR COMPENSATING POSITIONING ERRORS IN AN EDGING PROCESS, OR IN A FASTENING OPERATION FOR A RAW-EDGED, FINISHED SPECTACLE LENS, AND DEVICE THEREFOR

CROSS-REFERENCE TO RELATED APPLICATIONS

This application represents the U.S. National Phase of International Application number PCT/EP2019/058019 entitled "Method for Compensating for Positioning Errors in an Edging Process, or in a Fastening Operation for a Raw-Edged, Finished Spectacle Lens, and Device Therefor" filed Mar. 29, 2019, which claims benefit to German Patent Application number DE102018204948.3, Filed Mar. 29, 2018, all of which are incorporated herein by reference.

The invention relates to a method for compensating for positioning errors in an edging process or in a fastening process of raw-edged finished spectacle lenses and a device for this purpose.

For the edging of raw-edged finished spectacle lenses, it is known from the prior art to block or clamp the lenses and to grind the frame form by means of a (milling and/or grinding) tool. This process is known as grinding in, edging, or edge treatment.

For this treatment, the spectacle lenses can be clamped without a block, but can also be affixed by means of one or more blocking elements and/or adhesive pads. Milling tools or grinding tools are used for the treatment process, with which the lenses are ground into the frame form. For controlling the tools, centering data and shape data are used, which provide coordinates and shapes for the edging process.

Deviations during the grinding process can occur in this situation, for example due to geometric effects, such as malpositioning of the lenses during the blocking or clamping process.

However, this process cannot be used for particularly smooth spectacle surfaces, as the spectacles can slip out of their clamped or blocked position. The incorrect positioning of the lenses can lead to erroneous edge treatment of the lenses in the following steps, such as an edging process.

The object of the invention is to present a method which is suitable for accounting for and/or compensating for positioning errors of a lens, so that the lens can be edged in the desired shape.

The object is achieved by means of a method according to the main claim and a device according to a coordinate claim.

The invention will subsequently be presented in greater detail (with reference to the figures). In this, it is to be noted that various aspects will be described which can each respectively be employed individually or in combination. That is to say, any given aspect can be used with various design embodiments of the invention, as long as it is not explicitly presented as purely an alternative.

Furthermore, for the sake of simplicity, generally speaking only one entity will be referenced going forward. As long as it is not explicitly noted, the invention can also respectively exhibit a plurality of the concerned entities. In this respect, the words "a" or "an" are to be understood only as an indication that at least one entity is used in a simple design embodiment.

Insofar as methods are subsequently described, the individual steps of a method can be arranged and/or combined in an arbitrary order, as long as there this connection does not explicitly result in a deviation. Furthermore, the methods—as long as it is not otherwise explicitly designated—can be combined with one another.

Data with numerical values are generally not to be understood as exact values, but rather to be considered to have a tolerance of +/−1% up to +/−10%.

Reference to standards or specifications or norms are to be understood as reference to standards/specifications/norms which are/were valid at the time of application and/or at the time of priority application—insofar as priority is claimed. However, this is not to be understood as a general exclusion of the applicability of subsequent or replacement standards or specifications or norms.

In the following, "adjacent" explicitly includes an immediately proximal relationship, but without being limited hereto. In the following, "between" explicitly includes a position in which the intermediate component is in immediate proximity to the surrounding components.

The process for compensating for positioning errors in an edging process or in a fastening process of a raw-edged finished spectacle lens exhibits, for example, a step of determining the centering deviation parameters. In this, the centering deviation parameters can be indicative of a movement of the raw-edged finished spectacle lens (during a (mechanical) fastening operation). Such movements lead to positioning errors. The (mechanical) fastening process can take place with consideration of the determined centering deviation parameters in such a way that a movement of the raw-edged finished spectacle lens can be compensated. At the end of the mechanical fastening process, the raw-edged finished spectacle lens can be fastened such that during a subsequent (grinding) process any further movement of the raw-edged finished spectacle lens can be prevented. For example, in a further step, control information can be changed. The change of control information under consideration of the determined centering deviation parameters can take place such that the positioning errors of the raw-edged finished spectacle lens can be compensated or taken into account.

This has the advantage that correct finishing of the lenses, such as grinding or edging, can be performed economically and quickly, including for highly smooth surfaces.

The device designed for fastening and/or for compensation of positioning errors of a raw-edged finished spectacle lens, for a grinding process/edging process of the raw-edged finished spectacle lens, exhibits for example: a determining means, for determining of (centering) deviation parameters. Furthermore, the device can exhibit a fastening means, for fastening the raw-edged finished spectacle lens, such that further movement of the raw-edged finished spectacle lens during the subsequent (grinding) process can be prevented. Furthermore, the device can exhibit a control means, for changing the control information, based on determined (centering) deviation parameters, wherein the (centering) deviation parameters are indicative of the occurrence of positioning errors of the raw-edged finished spectacle lens during a fastening process and/or during a subsequent edging process. Furthermore, the device can exhibit a fastening mechanism, for introducing a mechanical fastening process of the raw-edged finished spectacle lens by means of the fastening means, based on the determined centering deviation parameters, wherein the centering deviation parameters are indicative of movement of the raw-edged finished spectacle lens during the mechanical fastening process, and the mechanical fastening process is performed with consideration of the determined centering deviation parameters, in order to compensate for the movement of the raw-edged finished spectacle lens. Furthermore, the device can exhibit a control unit for transferring the control information, on the basis of which a fastening process and/or a subsequent edging process can be performed, such that positioning errors of the raw-edged finished spectacle lens can be compensated or taken into account.

This has the advantage that correct grinding/edging of the lenses can be performed economically and quickly, including for highly smooth surfaces.

According to a first exemplary embodiment, the method furthermore exhibits that the movement of the raw-edged finished spectacle lens during the mechanical fastening process is limited by the mechanical fastening process, particularly until the end of the mechanical fastening process.

This embodiment has the advantage that it can require less calculation effort, as it takes advantage of the fact that movement of the lens only begins upon or shortly before physical contact of the lens with the chuck.

According to a first exemplary embodiment, the method furthermore exhibits that the occurrence of positioning errors of the raw-edged finished spectacle lens is limited by the fastening process and/or the subsequent edging process.

This embodiment has the advantage that it can require less determining effort and that any positioning errors that occur can be completely compensated or taken into account, as it takes advantage of the fact that positioning errors only occur upon physical contact of the lens with the chuck and/or with the edging tool.

According to a further exemplary embodiment, the method furthermore exhibits that the movement of the raw-edged finished spectacle lens during the mechanical fastening process exhibits a slipping or rotation of the raw-edged finished spectacle lens.

This embodiment has the advantage that it can require less calculation effort, as it takes advantage of the fact that the lens lies on the plate and thus there is less freedom in the range of motion of the lens.

According to a further exemplary embodiment, the method furthermore exhibits that the occurrence of positioning errors of the raw-edged finished spectacle lens exhibits a slipping or rotation during the fastening process and/or during the subsequent edging process of the raw-edged finished spectacle lens.

This embodiment has the advantage that it can require less determining effort, as it takes advantage of the fact that the corresponding (centering) deviations are easy to determine.

According to a further exemplary embodiment, the method furthermore exhibits that the compensation of the movement of the raw-edged finished spectacle lens during the mechanical fastening process exhibits a change in location of a predefined fastening point on the raw-edged finished spectacle lens at the end of the mechanical fastening process.

This embodiment exhibits the advantage that, due to the determination of a new holding point of the lens—that is, a fastening point of the lens after the lens movement, which corresponds in location to the original fastening point of the lens, the centering data up to that point can continue to be used, whereby the calculation effort can be minimized even further.

According to a further exemplary embodiment, the method furthermore exhibits that the determination of centering deviation parameters exhibits a reading of predetermined centering deviation parameters.

This embodiment exhibits the advantage that the determination of centering deviation parameters can be performed with low effort.

According to a further exemplary embodiment, the method furthermore exhibits that the compensation of the movement of the raw-edged finished spectacle lens during the mechanical fastening process exhibits a change of location of a predefined fastening point on the raw-edged finished spectacle lens at the beginning of the mechanical fastening process, such that the predefined fastening point is changed such that the raw-edged finished spectacle lens is fastened at an alternate fastening point, at which the movement of the raw-edged finished spectacle lens during the mechanical fastening process is minimized.

This embodiment exhibits the advantage that the centering data up to that point can continue to be used, whereby the calculation effort can be minimized even further.

According to a further exemplary embodiment, the method furthermore exhibits that the change of the control information exhibits a change in location of a predefined fastening point on the raw-edged finished spectacle lens, such that the predefined fastening point is changed in such a way that the raw-edged finished spectacle lens is fastened at an alternative fastening point, at which the occurrence of positioning errors of the raw-edged finished spectacle lens during the fastening process and/or the subsequent edging process is minimized.

This embodiment exhibits the advantage that the original centering and/or shape data for the subsequent edging process can still be used, whereby the determining effort can be minimized.

According to a further exemplary embodiment, the method further exhibits that the determination of centering deviation parameters exhibits a reading of predetermined centering deviation parameters.

This embodiment exhibits the advantage that the fastening process can be performed particularly quickly and with low computing effort during the fastening process.

According to a further exemplary embodiment, the method further exhibits that the change of control information exhibits a reading and/or a confirmation of correspondingly modified centering data and/or shape data for the subsequent edging process.

This embodiment exhibits the advantage that the change of control information can be performed particularly quickly and with low computing effort during the fastening process.

According to a further exemplary embodiment, the method further exhibits that the determination of centering deviation parameters exhibits a reading and/or a confirmation of correspondingly modified centering data for the subsequent grinding process.

This embodiment exhibits the advantage that the centering data is newly determined and thus can achieve an increased flexibility in the case of, for example, not fully reproducible movements, in order to be able to continue to grind accurately.

According to a further exemplary embodiment, the method further exhibits that the determination of centering deviation parameters takes place based on a tactile confirmation of the positioning errors of the raw-edged finished spectacle lens during the fastening process and/or during the subsequent edging process.

This embodiment exhibits the advantage that the occurring positioning errors during the fastening process and/or during the subsequent edging process can be compensated or taken into account individually and precisely.

According to a further exemplary embodiment, the method further exhibits that the determination of centering deviation parameters takes place based on a tactile measurement of the movement of the raw-edged finished spectacle lens during the mechanical fastening process.

This embodiment exhibits the advantage that the movement during the fastening process can be performed individually and precisely.

According to a further exemplary embodiment, the method further exhibits that the determination of centering deviation parameters takes place based on the confirmation of positioning errors by means of positioning confirmation of at least one engraving on the raw-edged finished spectacle lens during the fastening process and/or during the subsequent edging process.

This embodiment exhibits the advantage that the occurring positioning errors during the fastening process and/or during the subsequent edging process can be compensated or taken into account individually and precisely.

According to a further exemplary embodiment, the method further exhibits that the determination of centering deviation parameters takes place based on a measurement of the movement of at least one engraving on the raw-edged finished spectacle lens during the mechanical fastening process.

This embodiment exhibits the advantage that the movement can be performed during the fastening process individually and precisely.

According to a further exemplary embodiment, the method further exhibits that the change of the control information encompasses an additional fastening of the raw-edged finished spectacle lens such that the occurrence of positioning errors during the original fastening process and/or the subsequent edging process is minimized or totally prevented.

This embodiment exhibits the advantage that positioning errors during the fastening process and/or during the subsequent edging process can be prevented, whereby the lenses can be edged even more precisely.

The raw-edged finished spectacle lenses can thereby be coated in the typical manner. In the case of some so-called TopCoats, an exceptionally smooth surface is generated. For example, a SuperTopCoat with a defined layer thickness can be 9 nm. This leads to a reproducible and particularly smooth surface. If such a lens is then clamped—that is, fastened—by means of a typically commercially available blockless grinding machine, the lens can slip out of its fastening position due to the smooth lens surface. In order to fasten/clamp the lens, the lens must be placed in the grinding machine in a defined orientation horizontally on a plate. By means of a vacuum, the glass is sucked down from the top side and held up by the plate. For mechanical fastening, a so-called chuck is brought up from the underside of the lens, so that the lens is pressed together in the fastening position in the vertical direction and ideally fastened in this way. Due to the inherent optical effect of the lens and/or due to the interaction of the optical effect with an existing decentration, and in general due to the lens curvature, there is a wedge, a geometric prism, in the fastening point. Due to the force exerted (orthogonality) on the wedge during this pressing-together, the lens, particularly a lens with a (very) smooth surface, can thereby be forced out of the fastening position (for example in the horizontal plane). The force exerted on the wedge during the pressing-together can be orthogonal, essentially orthogonal, or non-orthogonal in relation to the side surfaces of the wedge. The resulting force can push the lens out of its fastening position. The direction in which the lens is pushed can be, for example, in the horizontal plane, but is not restricted to this. The extent of this slipping is dependent upon the strength of the prism present in the fastening point and can depend additionally upon the type of lens, for example a positive or negative effect in the lens, and on the contact pressure, the material composition of the lenses—such as for example the mechanical hardness—from the refractive index of the lenses, from the surface composition of the lenses, and/or the composition of the lens retention of the grinding machine.

The prism present in the fastening point can be described component-wise for example with $P\_hor$ and $P\_ver$, as the strength of the prism in the x-axis and in the y-axis respectively, see FIG. 1c. The deviations from the target centering data in the x-axis and y-axis and, if applicable, an axis position which occur in the grinding process/edging process, which are also summarily designated as centering deviations, can also be described and measured separately. In order to now compensate for the occurring centering deviations, for example, in the first step the prism in the fastening point can be calculated. This can be performed by means of a calculating tool. In this, the dimensions of the chuck can be taken into account—that is, the contact surface of the chuck in the fastening point of the lens over the extent of which the prism is to be calculated. In the next step, the centering deviations occurring in the grinding process/edging process, such as any slippage or rotation, can by systematically determined (e.g. calculated) for various (arbitrary) prisms. This can be performed in that raw-edged finished spectacle lenses with ideal optical effects are edged and suitable conclusions can be drawn from the measurement of the centering deviations. Thus the positioning errors occurring in the fastening fastening [sic] and/or in the subsequent edging process of the lens, such as for example undesired movements of the lens (in the fastening point), e.g. slippage and rotation, can be determined. The centering deviations are dependent upon $P\_hor$ and $P\_ver$ with appropriate process parameters of the grinding machines. Therefore, with sufficiently precise knowledge of this relationship in connection with the control information, the fastening position can be adapted/changed, so that the positioning errors to be expected (evoked for example by movement) in fastening and/or in the subsequent edging process can be correspondingly compensated or taken into account. The actual positioning errors—that is, the movements of the lens which actually occur—can also be determined with appropriate methods, so that the control information for the individual lens can be changed, whereby the precision of the compensation or the accounting for the positioning errors can be improved. The control information can consist of, for example, centering data and/or shape data, which is transferred to a grinding machine for the edging process and which describes, for example, the centering and/or shape of the edging. Furthermore, the control information can consist of, for example, the fastening position in which the lens is fastened. As described previously, a malpositioning of the lens during the fastening process and/or during the edging process can be appropriately compensated or taken into account by the adaptation of the control information. With this process, any possible tipping of the lenses can also be compensated. Thus a compensating movement and/or rotation of the fastening position can take place, corresponding to the actually occurring movement of the lens during the fastening process.

This process also allows for compensation of a possible tipping of the lens.

As the prism in the fastening point can be calculated for any surface geometry, this process is also correspondingly applicable to any surface geometry of the lenses.

The reject rate concerning grinding errors, such as for example centering deviations outside of a permissible tolerance—such as deviations of the centering data in the x-axis and/or y-axis and/or rotation of the axis position, the latter also known as axis rotation, can thus be improved, whereby costs can be saved and delivery times can be reduced.

The compensation or accounting for positioning errors, such as the movement of the lens during the fastening process, can also be performed in that an alternate fastening point is determined, in which the prism is small enough to minimize or to totally eliminate the lens movement. Unaltered control information can then be used for the edging process.

The compensation or accounting for the positioning errors of the lens during the fastening process can also be performed in that an alternate fastening position is determined that is chosen such that the lenses slide or are pushed into the original fastening position to be used. Unaltered control information can then be used for the edging process.

Furthermore, it is possible to use a tactile measurement in order to observe/measure the positioning errors, e.g. the movement, of the lens during the fastening process and/or the subsequent edging process and for example to adapt the control data (or the centering data) corresponding to this movement/positioning error, so that the lens can continue to be correctly or more precisely ground/edged.

Also, the positioning errors (e.g. the movement) can be determined by means of optical measurement, for example by means of a lensmeter or by means of an invisible engraving which is applied to the lens.

The compensation or accounting for the positioning errors of the lens during the fastening process can also be performed in that a temporary additional fastening—such as of a mechanical nature—minimizes or totally prevents the occurrence of positioning errors during the fastening process and/or during the subsequent edging process. Unaltered control information can then be used for the edging process.

FIGS. 1a-1c show schematic depictions in relation to the centering correction. In FIGS. 1a and 1b, a raw-edged finished spectacle lens is shows as a circular outline (solid line). The desired edged lens is shown in its outline as a correspondingly white cutout. If there is now a positioning change, depicted as a movement from the target centering point to the uncorrected centering point, the raw-edged finished spectacle lens shifts into an uncentered position, depicted as a dashed, filled-in circular outline. That means, if the edging process were performed now, the edged glass would become unusable, with a large deviation as depicted. In order to counteract this, the centering point/centering data is corrected, as depicted in FIG. 1b, so that despite the positioning change, the raw-edged finished spectacle lens can be edged correctly.

Figure 2B:
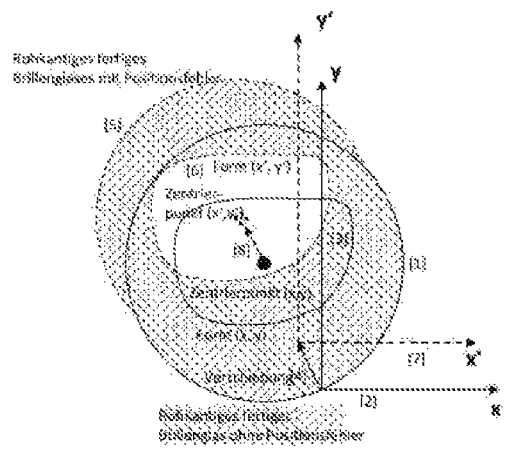

The change of control information can be seen from FIGS. 2a and 2b.

FIG. 2a initially shows unaltered control information for an edging process of a raw-edged finished spectacle lens without accounting for the positioning error. Here the raw-edged finished spectacle lens 1 and in the same reference system 2 the control information 3 (in this example centering point and shape for the edging process) are depicted.

Due to positioning errors during the fastening process of the raw-edged finished spectacle lens and/or during a subsequent edging process of the raw-edged finished spectacle lens, slippage 4 of the spectacle lens in relation to the target position can occur, depicted here as the raw-edged finished spectacle lens with positioning error 5. Without determination of the centering deviation parameters and alteration of the control information, the control information will continue to make use of the reference system 2 of the undisplaced spectacle lens 1, wherein the positioning error is not compensated.

In this example, the original control information 3 (that is, centering point and shape based on the original reference system 2) is used for edging, which results in an erroneous grinding result shape 3 due to positioning error 5 (erroneous position of centering point and shape on the lens) for the malpositioned lens.

FIG. 2b depicts the altered control information for an edging process of a raw-edged finished spectacle lens with accounting for the positioning error. Once again the raw-edged finished spectacle lens 1 and in the same (x, y) reference system 2 the control information 3 (in this example centering point (x, y) and shape (x, y) for the edging process) are depicted.

Due to positioning errors during the fastening process of the raw-edged finished spectacle lens and/or during a subsequent edging process of the raw-edged finished spectacle lens, slippage 4 of the spectacle lens in relation to the target position can occur, depicted here by the raw-edged finished spectacle lens with positioning error 5.

As previously described, the control information can now be altered by determination of the centering deviation parameters, so that the positioning errors of the raw-edged finished spectacle lens can be compensated or accounted for.

In this example, the centering deviation parameters have to do with the slippage 4 of the raw-edged finished spectacle lens in the (x, y) reference system. In this example, the change of control information encompasses a translation 8 of the centering point $(x \rightarrow x^1, y \rightarrow y^1)$ and correspondingly a translation of the shape $(x \rightarrow x^1, y \rightarrow y^1)$. The altered control information 6 is displaced in comparison to the original (x, y) reference system 2, or rather, fixed in location in the displaced $(x^1, y^1)$ reference system.

In this example, the displacement is compensated by the use of the altered control information for the edging process, whereby a correct grinding result shape 6 is achieved for the displaced lens despite the positioning error 5 (correct position of the centering point and the shape on the lens).

In this example, the displacement is compensated by the use of the altered control information for the edging process, whereby a correct grinding result shape 6 is achieved for the displaced lens despite the positioning error 5 (correct position of the centering point and the shape on the lens).

Figure 3A:
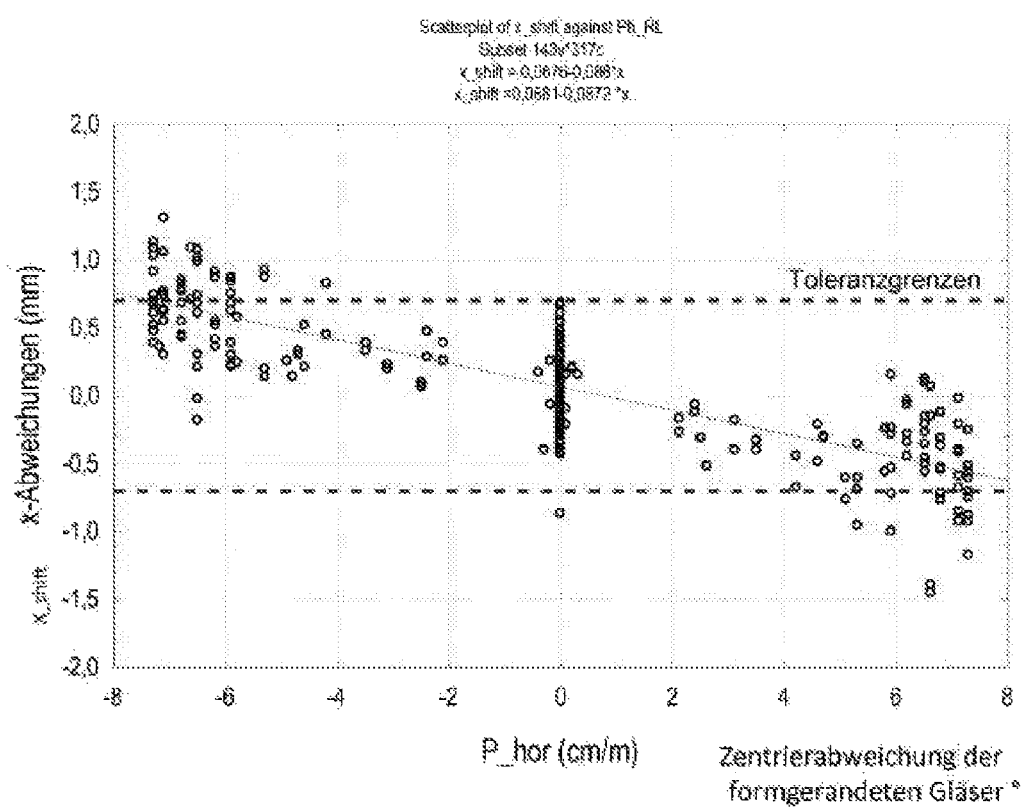
Figure 3B:
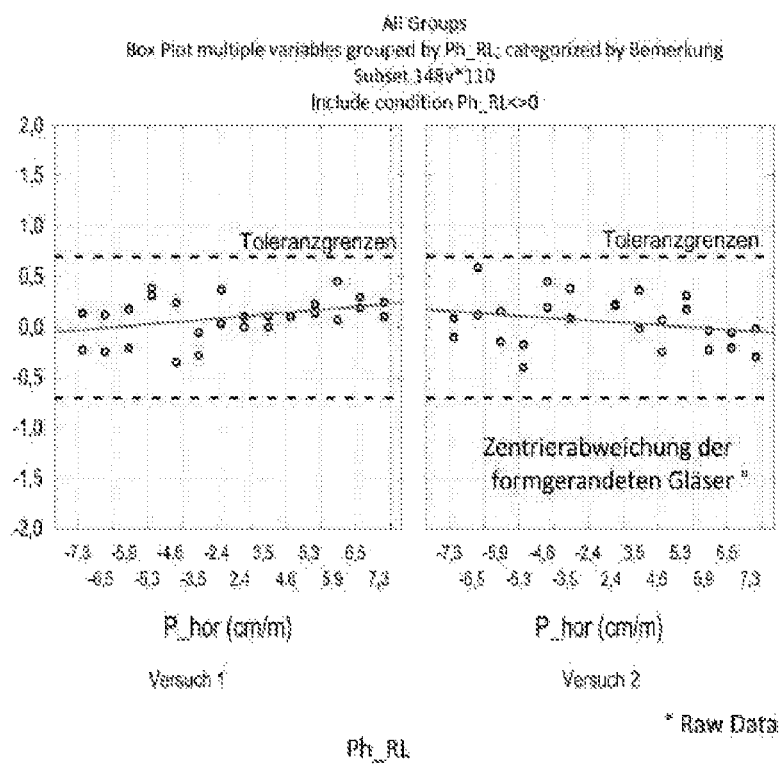

FIG. 3A depicts measurement results in relation to a horizontal centering deviations [sic] and FIG. 3B in relation to a horizontal centering deviations [sic] which is accounted for. The centering deviations for raw-edged finished spectacle lenses are thereby depicted after the edging process, dependent upon the prism in the fastening point. Lenses whose centering deviations lie outside of the tolerance range are considered rejects. In FIG. 3A, the positioning errors are not accounted for, as described in FIG. 2a. In FIG. 3B, the positioning errors are accounted for, as described in FIG. 2b. The reject rate comes in markedly lower with accounting for the positioning errors (here concretely overall 0% for x-axis deviations in both trials).

Figure 4A:
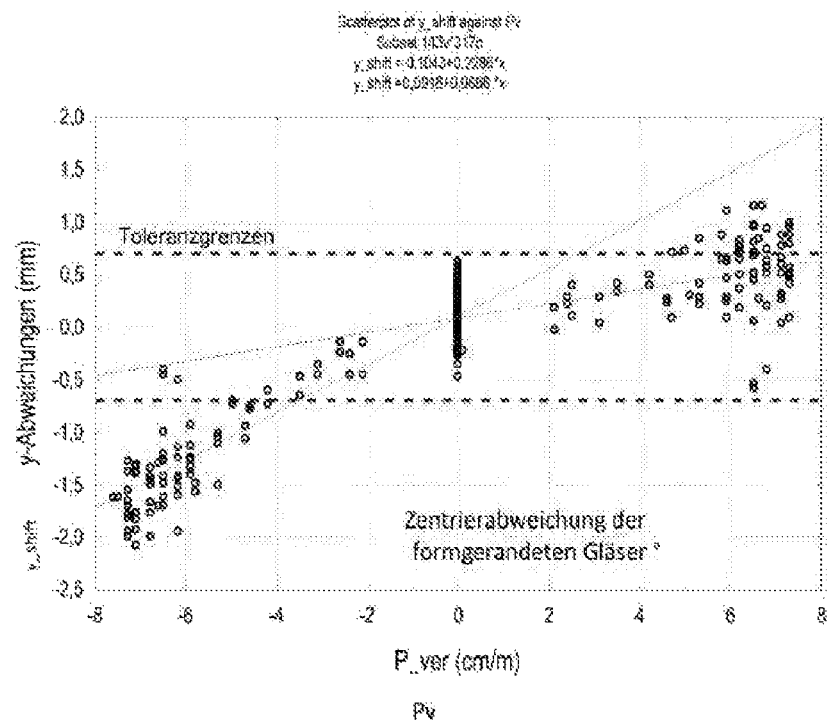
Figure 4B:
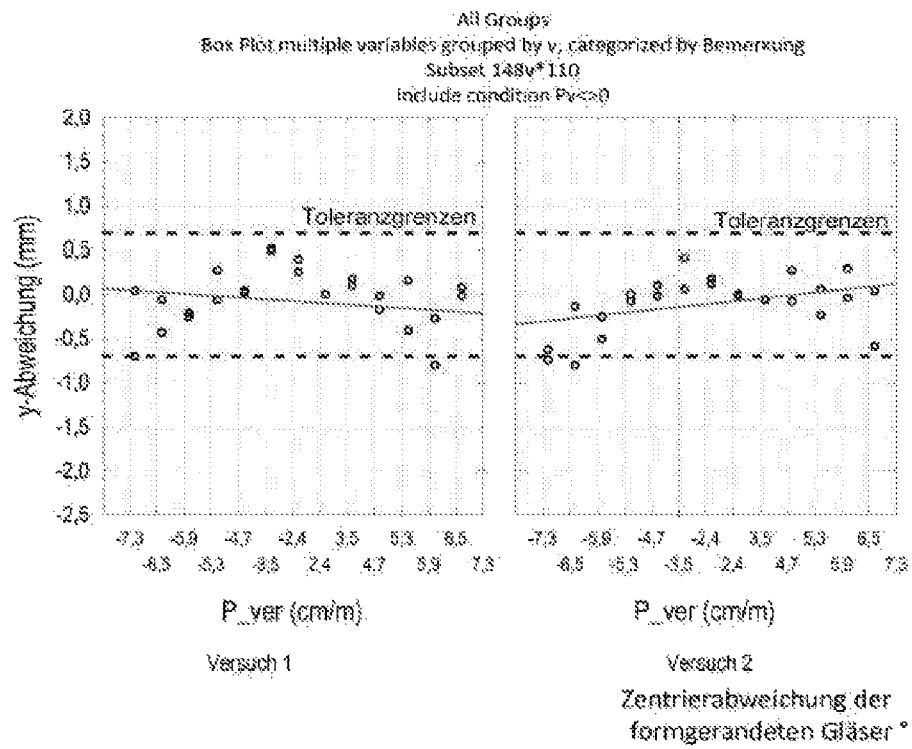

In FIG. 4A, measurement results in relation to a vertical centering deviations [sic] without the positioning errors and FIG. 3B [sic] in relation to a vertical centering deviations [sic] which is accounted for. The centering deviations for raw-edged finished spectacle lenses are thereby depicted after the edging process, dependent upon the prism in the fastening point. Lenses whose centering deviations lie outside of the tolerance range are considered rejects. In FIG. 4A, the positioning errors are not accounted for, as described in FIG. 2a. In FIG. 4B, the positioning errors are accounted for, as described in FIG. 2b. The reject rate comes in markedly lower with accounting for the positioning errors (here concretely overall 0% for x-axis deviations in both trials).

Figure 5:
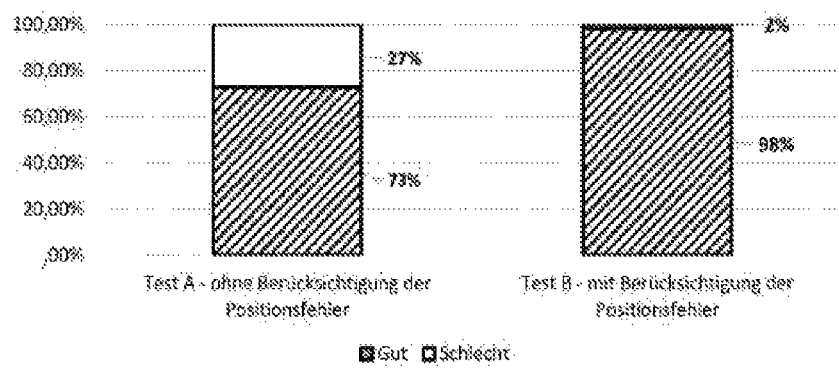

FIG. 5 depicts an example of the accept/reject rates for two representative tests. For both tests, raw-edged finished spectacle lenses with comparable effects were edged. For test A (FIG. 5 left side), the positioning errors were not accounted for, as described in FIG. 2a. There is a high reject rate (27%). For test B/FIG. 5 right side), the positioning errors were accounted for, as described in FIG. 2b. The reject rate falls markedly (2%).

The invention claimed is:

1. A method for compensating for positioning errors in an edging process or in a fastening process of a raw-edged finished spectacle lens having a curvature, the method comprising:
   fastening the lens with a fastener at a fastening point consisting of a contact surface of the lens where the fastener contacts the lens, wherein, due to the lens curvature, there is formed a geometric prism in the fastening point,
   determining centering deviation parameters, wherein the centering deviation parameters are indicative of the occurrence of positioning errors of the raw-edged finished spectacle lens during a fastening operation and/or during a subsequent edging process and wherein determination of the deviation parameters encompasses a calculation of the geometric prism in the fastening point, wherein the contact surface constitutes an extent of which the geometric prism is to be calculated, and
   changing control information with the help of the determined centering deviation parameters, such that the positioning errors of the raw-edged finished spectacle lens are compensated and/or accounted for and a path of a grinder is altered during the edging process based on the changing control information.

2. The method according to claim 1, wherein the occurrence of positioning errors of the raw-edged finished spectacle lens is induced by the fastening process and/or a subsequent edging process.

3. The method according to claim 1, wherein the occurrence of positioning errors of the raw-edged finished spectacle lens during the fastening process exhibits slippage and/or rotation during the fastening operation and/or during the subsequent edging process of the raw-edged finished spectacle lens.

4. The method according to claim 1, wherein the determination of centering deviation parameters exhibits a reading of predetermined centering deviation parameters.

5. The method according to claim 1, wherein the changing of control information exhibits a change in location of a predefined fastening point on the raw-edged finished spectacle lens.

6. The method according to claim 1, wherein the changing of control information exhibits a change in location of a predefined fastening point on the raw-edged finished spectacle lens such that the predefined fastening point is changed such that the raw-edged finished spectacle lens is fastened at an alternate fastening point, at which the occurrence of positioning errors of the raw-edged finished spectacle lens during the fastening operation and/or the subsequent edging process is reduced.

7. The method according to claim 1, wherein the changing of control information exhibits a reading and/or a confirmation of correspondingly modified centering data and/or shape data for the subsequent edging process.

8. The method according to claim 1, wherein the determination of centering deviation parameters takes place based on an optical measurement or a tactile confirmation of the positioning errors of the raw-edged finished spectacle lens during the fastening operation and/or during the subsequent edging process.

9. The method according to claim 1, wherein the determination of centering deviation parameters takes place based on the confirmation of positioning errors by means of positioning confirmation of at least one engraving on the raw-edged finished spectacle lens during the fastening operation and/or during the subsequent edging process.

10. The method according to claim 1, wherein the change of the control information encompasses an additional fastening of the raw-edged finished spectacle lens such that the occurrence of positioning errors during the original fastening process and/or the subsequent edging process is reduced or totally prevented.

11. The method according to claim 1, wherein the fastener is a chuck and fastening the lens at the fastening point includes mechanically fixing the raw-edged finished spectacle lens with the chuck.

12. The method according to claim 11, wherein calculating the prism in the fastening point takes into account an extension of the chuck and the prism is calculated via the contact surface of the chuck in the fastening point.

* * * * *